Dec. 10, 1940.                T. M. DUGAN ET AL                2,224,145
                    METHOD OF MAKING PIPE CONNECTIONS
                          Filed March 26, 1938

Inventors
THOMAS M. DUGAN and
EDWIN C. WRIGHT.
by: John E. Jackson
      their Attorneys.

Patented Dec. 10, 1940

2,224,145

UNITED STATES PATENT OFFICE 2,224,145

METHOD OF MAKING PIPE CONNECTIONS

Thomas M. Dugan, McKeesport, and Edwin C. Wright, Beaver, Pa., assignors to National Tube Company, a corporation of New Jersey Application March 26, 1938, Serial No. 198,306

3 Claims. (Cl. 113—112)

This invention relates to an improved tubular pipe connection, and particularly to a method of joining tubular members with the use of the same.

It is one of the objects of the present invention to provide an improved coupling for joining tubular members which is easily and inexpensively fabricated.

It is another object of the invention to provide an improved method of forming tubular articles which will produce a joint that is safe and rugged, and one that has a smooth and continuous interior surface.

It is a further object of the invention to provide a simple and inexpensive method of forming tubular members by the use of an improved coupling.

Various other objects and advantages of our invention will more fully appear in the course of the following specification, and will be particularly pointed out in the appended claims.

In the accompanying drawing, we have shown, for the purpose of illustration, one embodiment which our invention may assume in practice.

Figure 1:
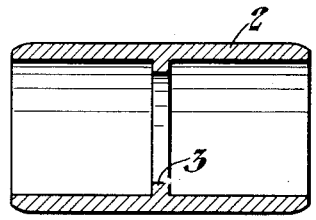
Figure 1 is a longitudinal section through the improved coupling of our invention.
Figure 2:
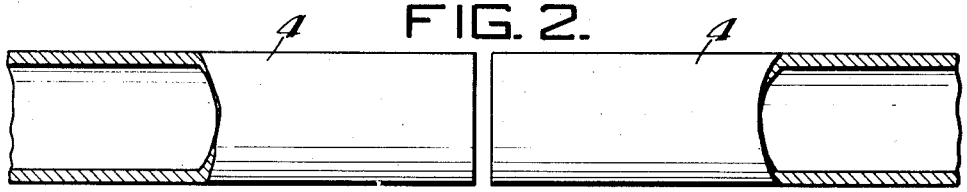
Figure 2 is an elevation of the ends of the pipes or tubular members to be formed.

Referring more particularly to the drawing, there is shown in Figure 1 the improved connection or coupling of our invention which comprises a tubular sleeve-like member 2 having located therein and centrally thereof an inner extending flange or shoulder 3 which is adapted to receive the ends 4 of the pipes shown in Figure 2 to join the same together.

The connection shown in the drawing is a straight coupling but it will be understood that the joint of our invention is equally applicable to joints wherein other types of fittings, such as T's and Y's, elbows, etc., are employed. The exterior diameter of the ends of the pipes 4 should be about four thousandths to six thousandths of an inch smaller than the internal diameter of the coupling or fitting, so that a close fitting sealing space is provided therebetween.

For hot rolled or forged ferrous alloy pipe, which is not generally made to very close tolerances, the outside diameter of the end section of the pipe should be machined or otherwise suitably sized to give it the diameter required. Machining will also remove any scale or adhesions and thus give a good clean surface with which the metallic sealing medium used will readily amalgamate. The close fit between the end sections 4 of the pipes and the interior of the coupling provides a space therebetween which is sufficiently small to cause capillary attraction but, due to our novel method of applying the sealing medium, it is not essential to have capillary attraction. However, a space of this dimension readily holds the solder or sealing medium in position and causes the joint to be much stronger. Thus, though a satisfactory joint can be made with a much larger spacing, it will not stand nearly as great "pull-out" tests as one in which the spacing is within the above outlined tolerances or dimensions.

The length of the joint should be proportioned to the diameter of the pipe if a joint having a "pull-out" strength approximating the tensile strength of the pipe and coupling is to be obtained. Thus, we have found that the length of the opposing surfaces should be approximately three-fourth inch for one-fourth inch pipe and should increase gradually in proportion to the diameter of the pipe to a length of about two and one-fourth inches for pipe four inches in diameter. In order that this distance may in all cases be accurately obtained, the interior of the fitting is provided with a shoulder 3 against which the end of the pipes 4 will abut when they are inserted within the coupling or fitting. This will insure insertion of the pipes to the proper distance; that is, neither too far nor not far enough. Furthermore, a shoulder of the same thickness as the wall thickness of the pipe end can be used and thereby a smooth and continuous interior surface will be obtained.

Figure 3:
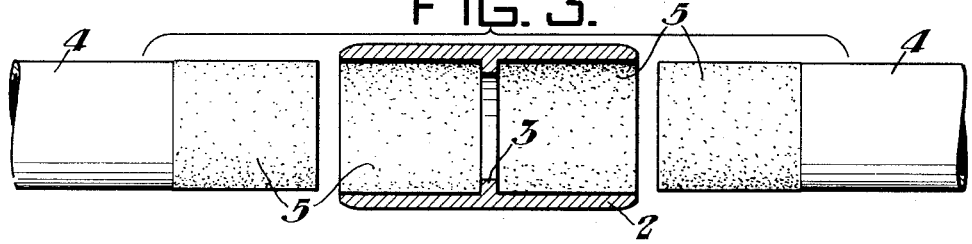
Figure 3 is a view showing the ends of the pipes and the interior of the coupling coated with a suitable metallic sealing medium, the first step of our improved method.

After the proper size coupling has been selected and the ends of the pipes machined or of the proper diameter to fit therein, a suitable metallic sealing medium 5 is applied either to the ends of the pipes or to the interior surfaces of the fitting or both, as shown in Figure 3.

The metallic sealing medium may be any suitable commercial type of solder, though we have found that either the ordinary 50 per cent. tin-50 per cent. lead or 95 per cent. tin-5 per cent. lead types are very satisfactory for joining ferrous pipes and couplings. Care should be taken to use a sealing medium which has a higher melting point than any temperature to which the joint will be subjected in service. The sealing medium is first applied to either the interior of the coupling or the end of the pipe but it has been found that the application to both will insure a stronger joint. The sealing medium may be applied either by hot dipping or by "wiping" the surfaces in accordance with conventional soldering practice.

It is contemplated that the couplings and the ends of the pipes may be so treated by the manufacturer as a part of the finishing operation. Thus, when it is desired to assemble the joint no preliminary operations are required. This is particularly good practice with ferrous fittings and pipes as the coating of sealing medium or solder prevents the formation of any scale thereon which would deleteriously affect the quality of joint obtained. If the installation requires the pipe to be cut, the end section of the pipe may be machined as before stated and the solder applied as before described. In the case of ferrous fittings and pipes it is, of course, necessary to first apply a flux before applying the solder. Any suitable commercial flux is satisfactory and the particular type used forms no part of the present invention, though we have found that a solution of zinc chloride and hydrochloric acid gives the best results of any that we have tried.

Figure 4:
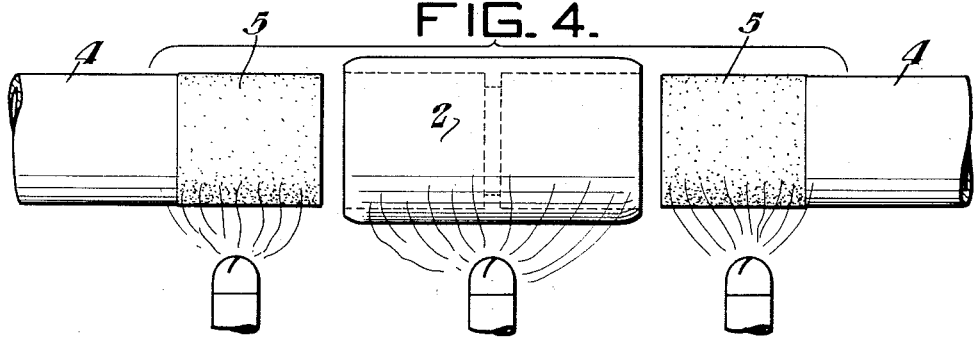
Figure 4 is a view showing the heating of the coupling and the ends of the pipes which is the next step; and, Figure 5 is a longitudinal section through the assembled coupling and the ends of the pipes after the connection is completed.

Both the ends of the pipes and the coupling are then heated, as shown in Figure 4, until the metallic sealing medium 5 or solder becomes molten or liquified. The temperature at which the metallic sealing medium used becomes molten depends, of course, upon its composition and will vary over a wide range. In order to procure the best results, it is necessary to heat both the fitting or coupling and the ends of the pipes to the melting point of the sealing medium used even though it is applied to only one of these members and preferably to heat the coupling sufficiently so as to cause it to slightly expand. Although the sealing medium will become molten and tend to flow by such heating a sufficient amount will be retained to fill the space between the pipe ends and the inner surfaces of the coupling in order to tightly seal the same.

Figure 5:
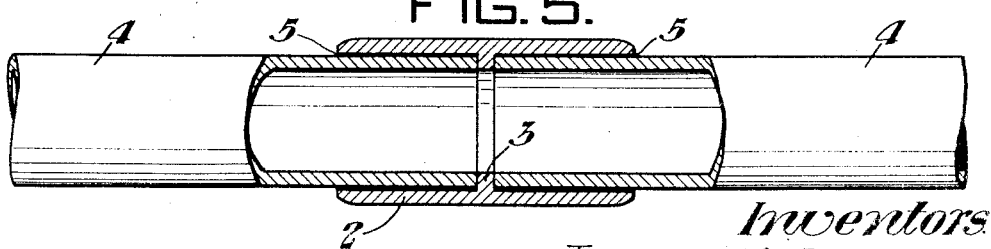

After the coupling or fitting and the ends of the pipes have been heated to the required temperature, to bring the metallic sealing medium to the molten state, the pipe ends 4 are inserted in the coupling or fitting until they abut against the shoulder 3, as shown in Figure 5. In case the sealing medium has been applied only to one of the members, that is to the ends of the pipes, and not to the inner surface of the coupling, or to the inner surface of the coupling and not to the ends of the pipes, the quality of the joint can be improved by giving the pipes a slight rotational movement with respect to each other. In case both the ends of the pipes and the coupling have been provided with a coating of sealing medium, such an operation generally, however, is not required, and it will be seen that a slight rotation of the coupling with respect to the pipe ends will give added assurance that the sealing medium or solder be spread evenly throughout the joint.

No further heating is required after the pipe has been inserted within the fitting. The prior heating before the two are telescoped is sufficient and the telescoping of the two members completes the joint. As soon as they have cooled, a joint equal in strength to that of the joined members will have been obtained, provided the spacing is of the proper order. As before stated, even though the spacing is larger, a good joint equal to strength of the sealing medium will be obtained but, of course, not nearly as strong as that obtained in joints where the spacing is of the proper order.

It may be noted that this method of making joints is equally applicable to copper, aluminum and other tubular members as well as those composed of ferrous alloys. Moreover, it can be employed when the fittings are copper or brass and the pipe steel. This is a decided advantage for certain types of fittings can be more readily made by extruding, by which method cupreous fittings are generally made, than by the various methods of making ferrous alloy fittings.

While we have, in this application, specifically shown and described an embodiment of our invention, it will be understood that this embodiment is merely for the purpose of illustration and description, and that various other forms may be devised within the scope of the invention, as defined in the appended claims.

We claim:

1. The method of joining the ends of tubular members and the like which comprises providing a connecting member adapted to receive the ends of said tubular members, coating the end portions of said tubular members with a metallic sealing medium, heating said connecting member sufficiently so as to cause it to slightly expand and heating the end portions of each of said tubular members merely to a temperature high enough to bring the sealing medium thereon to a molten state, and finally inserting the ends of said tubular members into said connection and permitting the connection to cool whereby a strong and durable bond is obtained between the connection and the tubular members.

2. The method of joining the ends of tubular members which comprises providing a threadless coupling member having an internal diameter of from .004 to .006 of an inch larger than the external diameter of the ends of the tubular members which it is adapted to receive, coating the end portion of the tubular members to be joined with a metallic sealing medium, heating the coupling sufficiently so as to cause it to slightly expand and heating the ends of the tubular members merely to a temperature high enough to bring the metallic sealing medium thereon to a molten state, and finally inserting the ends thereof into said coupling member and permitting the same to cool whereby a strong and durable bond is obtained between the coupling and tubular members.

3. The method of joining the end of a metallic tubular member with a threadless metallic connecting member which comprises providing a threadless connecting member having an internal diameter of from .004 to .006 of an inch larger than the external diameter of the end of the tubular member, and having a shoulder disposed therein at a predetermined spaced distance from the end thereof, at least coating the end of the tubular member with a metallic sealing medium, heating the connecting member sufficiently so as to cause it to slightly expand and heating the end of the tubular member merely to a temperature high enough to bring the metallic sealing medium thereon to a molten state, and finally inserting the end thereof into said connecting member so that the end abuts against the shoulder therein and permitting the same to cool whereby a strong and durable bond is obtained between the connecting member and the tubular member.

THOMAS M. DUGAN.
EDWIN C. WRIGHT.